(12) United States Patent
Hayashima et al.

(10) Patent No.: US 10,683,821 B2
(45) Date of Patent: Jun. 16, 2020

(54) ENGINE CONTROL DEVICE

(71) Applicant: TOYOTA JIDOSHA KABUSHIKI KAISHA, Toyota-shi (JP)

(72) Inventors: Naoki Hayashima, Toyota (JP); Masatomo Yoshihara, Toyota (JP); Koji Murakami, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/274,443

(22) Filed: Feb. 13, 2019

(65) Prior Publication Data
US 2019/0178221 A1 Jun. 13, 2019

Related U.S. Application Data

(62) Division of application No. 15/895,110, filed on Feb. 13, 2018, now abandoned.

(30) Foreign Application Priority Data

Feb. 16, 2017 (JP) ................... 2017-026602

(51) Int. Cl.
*F02P 5/15* (2006.01)
*F02D 41/04* (2006.01)
(Continued)

(52) U.S. Cl.
CPC ......... *F02D 41/042* (2013.01); *F02D 41/009* (2013.01); *F02P 3/0556* (2013.01);
(Continued)

(58) Field of Classification Search
USPC ...................................... 701/112
See application file for complete search history.

(56) References Cited

U.S. PATENT DOCUMENTS 3,251,352 A * 5/1966 Walker .............. F02M 3/02
123/198 DC
4,324,217 A * 4/1982 Ina .............. F02P 3/0456
123/406.63
(Continued)

FOREIGN PATENT DOCUMENTS

JP 63-219836 A 9/1988
JP 3-46670 B2 7/1991
(Continued)

OTHER PUBLICATIONS

U.S. Office Action issued in U.S. Appl. No. 16/274,486 dated Oct. 8, 2019.
(Continued)

*Primary Examiner* — Kevin R Steckbauer
(74) *Attorney, Agent, or Firm* — Oblon, McClelland, Maier & Neustadt, L.L.P.

(57) ABSTRACT

An engine control device includes an electronic control unit. The electronic control unit is configured to perform a spark discharge with an ignition plug for each cylinder by cutting off energization after elapse of a predetermined period from start of energization to an ignition coil for each cylinder of the engine, to stop the spark discharge caused by the ignition plug for each cylinder after supply of fuel to the engine is stopped when operation of the engine is stopped, and to control an ignition plug so as to stop the spark discharge caused by the ignition plug from a cylinder after a rotation speed of a crankshaft decreases gradually and the rotation speed of the crankshaft reaches a preset threshold value or less, after the stop of the supply of fuel to the engine.

2 Claims, 9 Drawing Sheets

(51) Int. Cl.
  *F02D 41/00*   (2006.01)
  *F02P 3/055*   (2006.01)
  *F02P 11/02*   (2006.01)

(52) U.S. Cl.
  CPC ........... *F02P 5/1502* (2013.01); *F02P 5/1504* (2013.01); *F02P 11/025* (2013.01); *F02D 2200/101* (2013.01); *F02D 2250/06* (2013.01)

(56) References Cited

U.S. PATENT DOCUMENTS

| | | | |
|---|---|---|---|
| 4,347,570 A | 8/1982 | Akiyama | |
| 7,079,941 B2* | 7/2006 | Tetsuno | F02N 11/0814 701/112 |
| 7,156,083 B2* | 1/2007 | Nakamura | F02D 41/009 123/631 |
| 7,159,571 B2* | 1/2007 | Kassner | F02D 41/009 123/479 |
| 8,838,368 B2* | 9/2014 | Mitsui | F02D 9/02 123/179.4 |
| 10,099,675 B2* | 10/2018 | Shafto | B60W 10/04 |
| 2005/0221952 A1* | 10/2005 | Tetsuno | F02N 11/0814 477/115 |
| 2006/0162701 A1* | 7/2006 | Kassner | F02D 41/009 123/479 |
| 2006/0190161 A1* | 8/2006 | Nakamura | F02D 41/009 701/114 |
| 2011/0288753 A1* | 11/2011 | Mitsui | F02D 9/02 701/112 |
| 2016/0115932 A1* | 4/2016 | Shafto | B60W 10/04 123/179.4 |

FOREIGN PATENT DOCUMENTS

| | | |
|---|---|---|
| JP | 8-195320 A | 7/1996 |
| JP | 10-252629 A | 9/1998 |
| JP | 2000-291457 | 10/2000 |
| JP | 2003-155940 A | 5/2003 |
| JP | 2005-351136 A | 12/2005 |
| JP | 2010-255591 | 11/2010 |
| JP | 2015-200278 A | 11/2015 |

OTHER PUBLICATIONS

Office Action dated May 29, 2019 in U.S. Appl. No. 16/274,486, 9 pages.
Advisory Action issued in U.S. Appl. No. 16/274,486 dated Jan. 17, 2020.
U.S. Office Action issued in U.S. Appl. No. 16/274,486 dated Apr. 7, 2020.

* cited by examiner

ENGINE CONTROL DEVICE

INCORPORATION BY REFERENCE

This application is a division of U.S. patent application Ser. No. 15/895,110 filed Feb. 13, 2018, which claims the benefit of priority from prior Japanese Patent Application No. 2017-026602 filed Feb. 16, 2017, the entire contents of each of which is incorporated herein by reference.

BACKGROUND

1. Technical Field

The present disclosure relates to a control device that stops the supply of fuel to an engine and ignition of the fuel to stop the operation of the engine, and particularly, to a spark discharge caused by an ignition plug for each cylinder.

2. Description of Related Art

Generally, a system (stop and start system), which automatically stops an engine of a vehicle during idling or the like and then automatically restarts the engine, is well-known in the related art. When the engine is stopped in the system as described above, normally, a throttle valve is closed, supply of fuel by an injector is stopped (fuel cut), and then, a spark discharge caused by an ignition plug is continued for a while, and the spark discharge caused by the ignition plug is stopped when unburned fuel remaining within a cylinder is combusted (refer to Japanese Unexamined Patent Application Publication No. 2010-255591 (JP 2010-255591 A)).

SUMMARY

However, in a case where the spark discharge caused by the ignition plug is continued for a while after a fuel cut as described above, the duration time of the spark discharge caused by the ignition plug becomes a problem. That is, when the time for which the spark discharge caused by the ignition plug is continued is significantly shorter than usual, the unburned fuel within the cylinder cannot be sufficiently combusted and may be released into the ambient air. Thus, there is a possibility that aggravation of emissions is caused. On the other hand, continuing an unneeded spark discharge caused by the ignition plug until after unburned fuel is substantially exhausted leads to an increase in wasteful power consumption.

Energization time may become extremely long due to the reverse operation of a crankshaft immediately before the stop of the engine. As a result, degradation of the ignition coil may be accelerated, and there is also a possibility that the service life of the ignition coil is shortened. In detail, first, when a fuel cut occurs as described above, the crankshaft rotates with inertia for a while after that, and the kinetic energy of a rotating part becomes gradually small with a decrease in the rotation speed of the crankshaft.

Thus, the crankshaft is not able to exceed a top dead center in a compression stroke of one of the cylinders. As a result, the crankshaft is reversely operated before the top dead center after being stopped first. In this case, normally, there is a case where the energization cutoff timing of the ignition coil set in the vicinity of the top dead center may not be reached. Therefore, when the energization to the ignition coil is started before the reverse operation of the crankshaft, the energization may continue even during the elapse of a guard time set for the protection of the ignition coil.

The present disclosure provides an engine control device that, by virtue of a suitable spark discharge caused by the ignition plug after a fuel cut at an engine stop, further suppresses wasteful power consumption without causing aggravation of emissions and further restrains premature degradation of an ignition coil.

A first aspect of the present disclosure relates to an engine control device including an electronic control unit. The electronic control unit is configured to perform a spark discharge with an ignition plug for each cylinder by cutting off energization after elapse of a predetermined period from start of energization to an ignition coil for each cylinder of the engine, and to stop the spark discharge caused by the ignition plug for each cylinder after supply of fuel to the engine is stopped when operation of the engine is stopped.

Also, the electronic control unit is configured to control an ignition plug so as to stop the spark discharge caused by the ignition plug from a cylinder after a rotation speed of a crankshaft decreases gradually and the rotation speed of the crankshaft reaches a preset threshold value or less, after the stop of the supply of fuel to the engine. The crank rotation speed may have, for example, a value obtained by averaging rotation speeds calculated based on crank signals, and may be a so-called engine speed.

According to the first aspect of the present disclosure, first, when a fuel cut is performed in order to stop the operation of the engine and the rotation speed of the crankshaft that rotates with inertia decreases gradually, and when the rotation speed of the crankshaft is higher than the preset threshold value, the spark discharge caused by the ignition plug is continued and unburned fuel within the cylinder is combusted. On the other hand, when the crank rotation speed becomes the threshold value or less, the spark discharge caused by the ignition plug is stopped, and wasteful power consumption is further suppressed. Since a possibility that the crankshaft is reversely operated after the start of the energization to the ignition coil becomes low, a situation in which the energization time becomes extremely long as described above can be further suppressed.

In the engine control device according to the first aspect of the present disclosure, the threshold value may be set to such a rotation speed that the crankshaft is reversely operated in accordance with a compression reaction force of the cylinder when the rotation speed of the crankshaft becomes lower than the threshold value. According to the first aspect of the present disclosure, the crankshaft is no longer reversely operated after the start of the energization to the ignition coil, and the energization time to the ignition coil can be further restrained from becoming extremely long. Therefore, the wasteful power consumption can be further suppressed without causing aggravation of emissions, and premature degradation of the ignition coil can be further restrained.

Similar to a first aspect of the present disclosure, a second aspect of the present disclosure relates to an engine control device including an electronic control unit. The electronic control unit is configured to perform a spark discharge with an ignition plug for each cylinder by cutting off energization after elapse of a predetermined period from start of energization to an ignition coil for each cylinder of the engine, to stop the spark discharge caused by the ignition plug for each cylinder of the engine after supply of fuel to the engine is stopped when operation of the engine is stopped, and to retard an energization start timing to an ignition coil as a rotation speed of a crankshaft becomes lower when the rotation speed of the crankshaft decreases gradually after the stop of the supply of fuel to the engine.

According to the second aspect of the present disclosure, the unburned fuel within the cylinder is combusted by the spark discharge caused by the ignition plug being continued even after a fuel cut is performed in order to stop the operation of the engine, first. In this case, since the energization start timing to the ignition coil is retarded by the electronic control unit as the rotation speed of the crankshaft that rotates with inertia decreases gradually, the energization time to the ignition plug becomes short, and the wasteful power consumption is further suppressed.

Since the energization start timing to the ignition coil is retarded as described above, the energization time becomes shorter as the start of the energization becomes slower, even when the crankshaft is reversely operated and thereafter the energization cutoff timing is not reached as described above. That is, a situation in which the energization time to the ignition coil becomes extremely long due to the reverse operation of the crankshaft can be further suppressed, and the premature degradation of the ignition coil can be further restrained.

In the engine control device according to the second aspect of the present disclosure, the electronic control unit may be configured to retard an energization start timing to the ignition coil until after a compression top dead center of a cylinder when the rotation speed of the crankshaft becomes equal to or lower than a preset threshold value. According to the second aspect of the present disclosure, when the crankshaft is reversely operated before the compression top dead center of the cylinder, the energization to the ignition plug is not started. Thus, there is no case where the energization time to the ignition coil becomes extremely long as described above due to the reverse operation of the crankshaft.

Similar to the first and second aspects of the present disclosure, a third aspect of the present disclosure relates to an engine control device including an electronic control unit. The electronic control unit is configured to perform a spark discharge with an ignition plug for each cylinder by cutting off energization after elapse of a predetermined period from start of energization to an ignition coil for each cylinder of the engine, and to stop the spark discharge caused by the ignition plug for each cylinder of the engine after supply of fuel to the engine is stopped when operation of the engine is stopped. The engine control device cuts off the energization to the ignition coil even before the elapse of the predetermined period in a case where a crankshaft is reversely operated after the start of energization to the ignition coil.

According to the third aspect of the present disclosure, the unburned fuel within the cylinder is combusted by the spark discharge caused by the ignition plug being continued even after a fuel cut is performed in order to stop the operation of the engine, first. When the crankshaft is reversely operated after the rotation speed of the crankshaft that rotates with inertia decreases gradually and the energization to the ignition coil of one of the cylinders is started, the energization is cut off even before a predetermined period elapses since the start of the energization (that is, the energization cutoff timing is not reached).

That is, even when the crankshaft is reversely operated after the start of the energization to the ignition coil resulting from the spark discharge caused by the ignition plug as described above and the energization cutoff timing is not reached, there is no case where the energization time becomes extremely long as described above. Therefore, the wasteful power consumption can be further suppressed, and the premature degradation of the ignition coil can be further restrained.

According to the control device of the aspect of the present disclosure as described above, when the operation of the engine is stopped, the spark discharge caused by the ignition plug is continued for a while even after the supply of the fuel is stopped. Accordingly, the unburned fuel within the cylinder can be combusted. In the first aspect of the present disclosure, when the rotation speed of the crankshaft decreases gradually and becomes equal to or lower than the threshold value, the spark discharge caused by the ignition plug is stopped. Accordingly, the wasteful power consumption can be further suppressed, and a situation in which the energization time to the ignition coil becomes extremely long can be further suppressed.

In the second aspect of the present disclosure, the energization start timing to the ignition coil is retarded as the rotation speed of the crankshaft decreases gradually as described above. Accordingly, the wasteful power consumption can be further suppressed, and a situation in which the energization time to the ignition coil becomes extremely long can also be further suppressed. In the third aspect of the present disclosure, the energization is cut off when the crankshaft is reversely operated. Accordingly, the energization time can be further restrained from becoming extremely long.

Therefore, by virtue of the first to third aspects of the present disclosure, the wasteful power consumption can be further suppressed without causing the aggravation of emissions when the engine is stopped, the premature degradation of the ignition coil resulting from the energization time becoming extremely long can be further restrained.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to the drawings. The present embodiment is an example, and a case where an aspect of the present disclosure is applied to a gasoline engine mounted on a vehicle will be described.

Outline of Engine

Figure 1:
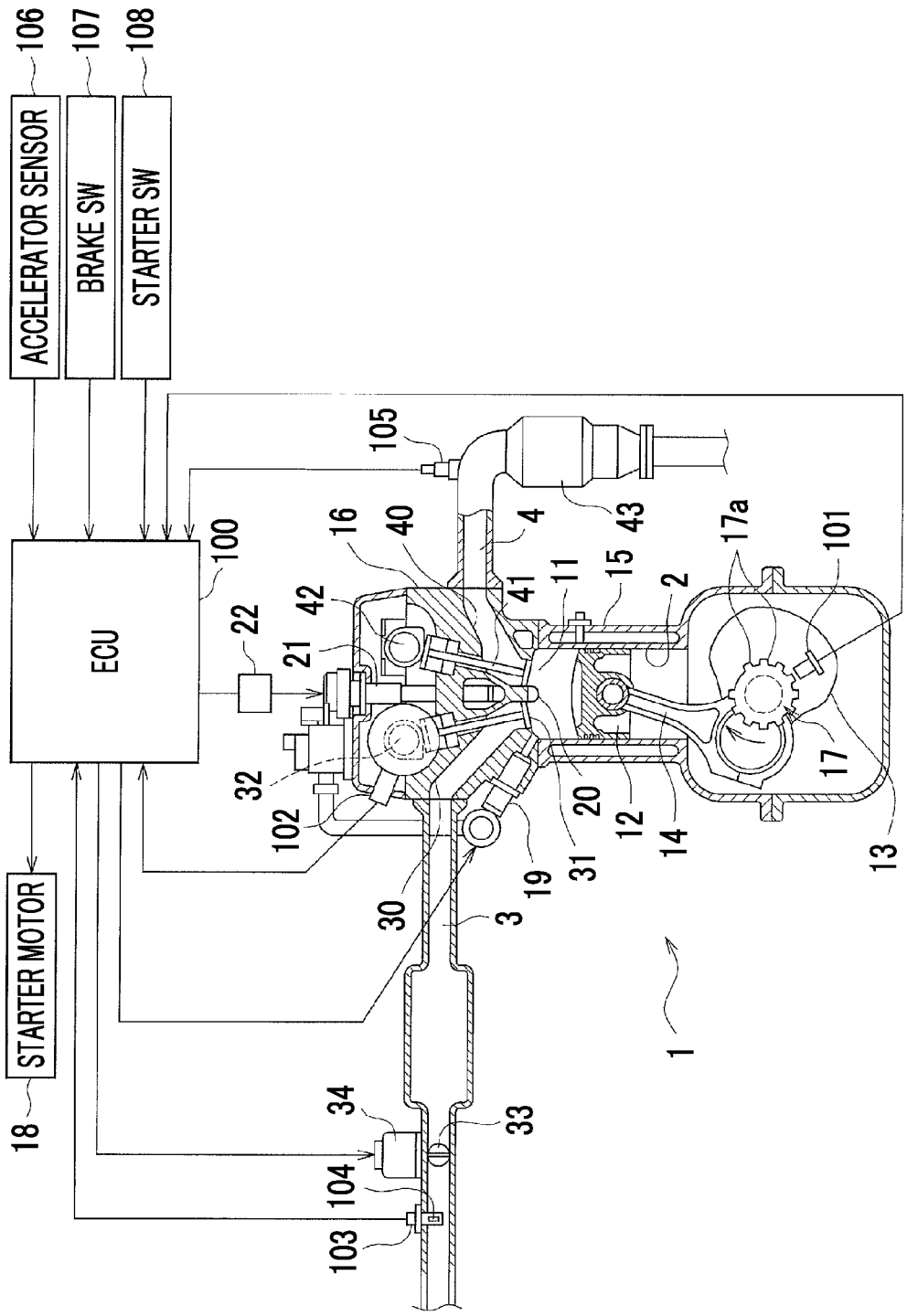
FIG. 1 is a schematic configuration view of an engine control device related to an embodiment.

Although a schematic configuration of the engine 1 is illustrated in FIG. 1, the engine 1 of the present embodiment is a four-cylinder gasoline engine, a piston 12 is accommodated in each of four first to fourth cylinders 2 (solely one is illustrated in the drawings) so as to define a combustion chamber 11. The piston 12 and a crankshaft 13 are coupled together by a connecting rod 14, and a crank angle sensor 101 for detecting the rotational angle (crank angle) of the crankshaft 13 is provided.

In detail, a signal rotor 17 is attached to the crankshaft 13, and a plurality of gear teeth 17a is provided on an outer peripheral surface of the signal rotor 17. Meanwhile, the crank angle sensor 101 includes, for example, two electromagnetic pickups and is adapted to output a pulse signal from each electromagnetic pickup whenever the gear teeth 17a of the signal rotor 17 passes due to the rotation of the crankshaft 13.

A signal output from one of the two electromagnetic pickups is a crank signal, and a signal output from the other electromagnetic pickup has a predetermined phase difference from the crank signal. For this reason, whether or not the crankshaft 13 is rotating normally (rotating reversely) can be determined depending on whether the signal from the other electromagnetic pickup is any of low and high signals when the signal from the one electromagnetic pickup rises or falls.

Although not illustrated, a flywheel is attached to an end part of the crankshaft 13 so as to rotate integrally, and a starter motor 18 (schematically illustrated in FIG. 1) is disposed so that a pinion gear can be rotated in engagement with a ring gear formed at an outer periphery of the flywheel. The starter motor 18 operates upon the reception of the signal from an ECU 100 as will be described below during the normal starting of the engine 1.

A cylinder head 16 is placed at an upper part of a cylinder block 15, an injector 19 is disposed in each cylinder 2, to face the combustion chamber 11. For example, the fuel injected from the injector 19 in an intake stroke of the cylinder 2 forms an air-fuel mixture while riding on the flow of intake air within the cylinder 2 and being diffused. In order to ignite the air-fuel mixture formed as described above, an ignition plug 20 is disposed in the cylinder head 16 for each cylinder 2.

An ignition coil 21 is directly attached to the ignition plug 20, and the ignition coil 21 and an ignitor 22 are provided integrally with the ignition coil 21 although these are separately illustrated in the drawing for convenience. The ignitor 22 receives an energization signal from the ECU 100 to energize the ignition coil 21 (primary coil), and then, receives a cutoff signal to rapidly cut off the energization, thereby causing a high voltage to be supplied from the ignition coil 21 (from a secondary coil) to the ignition plug 20.

An intake port 30 and an exhaust port 40 are formed in the cylinder head 16 so as to communicate with the combustion chamber 11 within each cylinder 2, and openings that face the interiors of the respective cylinders 2 are opened and closed by an intake valve 31 and an exhaust valve 41. A valve train in which the intake valve 31 and the exhaust valve 41 are operated includes two camshafts 32, 42 for intake and exhaust, and is rotated with the crankshaft 13 via a timing chain and a sprocket that are not illustrated.

A cam angle sensor 102 is provided in the vicinity of the intake camshaft 32 so as to output a pulse signal (hereinafter, referred to as a cam signal) when one of the cylinders 2 is at a predetermined crank angle position (for example, the first cylinder 2 is at a top dead center). Since the intake camshaft 32 rotates at half of the speed of the crankshaft 13, the cam angle sensor 102 outputs a cam signal at least once whenever the crankshaft 13 makes two rotations (the crank angle varies 720°).

An air flow meter 103, an intake air temperature sensor 104 (built in the air flow meter 103), and an electronic-control-type throttle valve 33 are disposed in an intake passage 3 that communicates with an upstream side (upstream side of the flow of intake air) of the intake port 30. The throttle valve 33 is driven by a throttle motor 34 so as to throttle the flow of intake air to adjust the intake air amount of the engine 1.

As described above, the intake air of which the flow rate has been adjusted by the throttle valve 33 flows into each cylinder 2 from the intake port 30, and is mixed with the fuel injected from the injector 19 as described above, to form an air-fuel mixture. Then, the air-fuel mixture is ignited and combusted by the ignition plug 20 in a rear half of a compression stroke, and thereby, the generated gas flows out the exhaust port 40 in an exhaust stroke of the cylinder 2. A catalyst 43 for controlling exhaust gas is disposed in an exhaust passage 4 that communicates with a downstream side (a downstream side of the flow of exhaust gas) of the exhaust port 40, and an air-fuel-ratio sensor 105 is disposed upstream of the catalyst 43.

ECU

The engine 1 configured as described above is controlled by the ECU 100. The ECU 100 is a well-known electronic control unit, and includes a central processing unit (CPU), a read-only memory (ROM), and a random access memory (RAM), and a backup RAM, or the like. The CPU executes various kinds of calculation processing based on control programs and maps that are stored in the ROM. The RAM temporarily stores calculation results in the CPU and the data input from the respective sensors, and the backup RAM stores, for example, the data to be saved at the stop of the engine 1.

In addition to the crank angle sensor 101, the cam angle sensor 102, the air flow meter 103, the intake air temperature sensor 104, the air-fuel-ratio sensor 105, and the like, an accelerator sensor 106 that detects the operation amount (throttle valve opening degree) of an accelerator pedal, a brake switch (brake SW) 107 that detects the operation of a brake pedal, a starter switch (starter SW) 108 for actuating the starter motor 18, and the like are connected to the ECU 100.

The ECU 100 controls the operational state of the engine 1 by executing the various control programs based on the signals input from the various sensors and the switches 101 to 108. For example, the ECU 100 executes fuel injection control using the injector 19 (the control of injection amount and fuel injection timing), spark discharge caused by the ignitor 22 (the control of ignition timing by the ignition plug 20), the control of the throttle valve 33 by the throttle motor 34 (namely, the control of the intake air amount), and the like.

Figure 2:
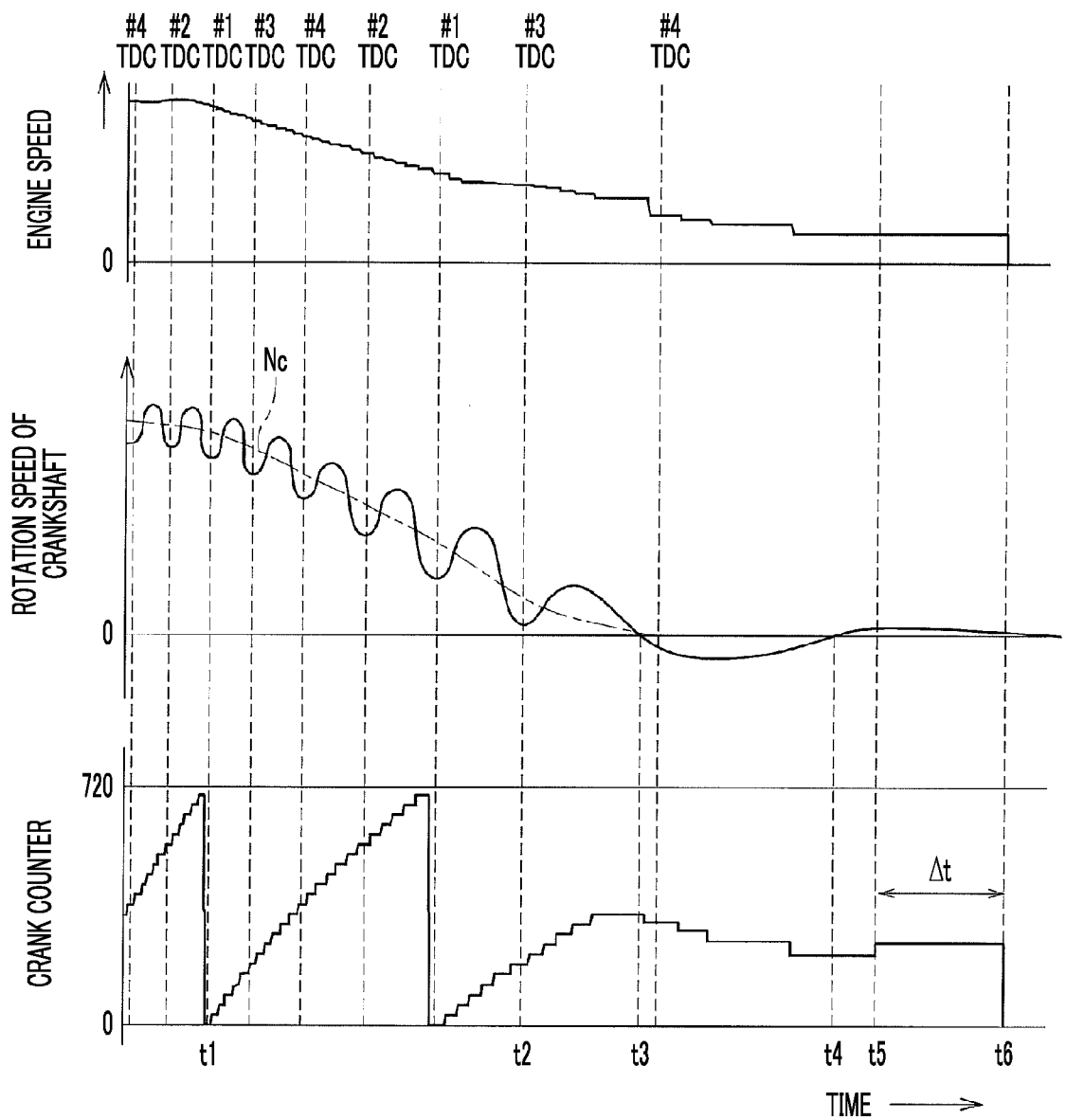
FIG. 2 is a timing chart illustrating an example of the engine speed when an engine is stopped, the rotation speed of a crankshaft, and the changes of crank counter.

The fuel injection control and the spark discharge as described above are performed at a suitable timing for each cylinder 2, and a crank counter having two rotations (720° at the crank angle) of the crankshaft 13 as one cycle is produced. As an example is illustrated in FIG. 2, the crank counter is produced, for example, with a top dead center (#1TDC) of a first cylinder 2 as a reference, is reset in accordance with the input of a cam signal at time t1 as illustrated at a lower stage of FIG. 2, and is counted up in accordance with the input of the crank signal after a counted value reaches 0.

When the starter SW 108 is turned on, the ECU 100 actuates the starter motor 18, rotates (cranks) the crankshaft 13, and executes the control of fuel injection and ignition at starting to start (normal starting) the engine 1. As described below, the ECU 100 also executes an stop and start control in which the engine 1 is automatically stopped in a predetermined situation, such as when a vehicle is stopped, and the engine 1 is restarted without using the starter motor 18 in accordance with a driver's subsequent predetermined operation.

Stop and Start Control

Figure 3:
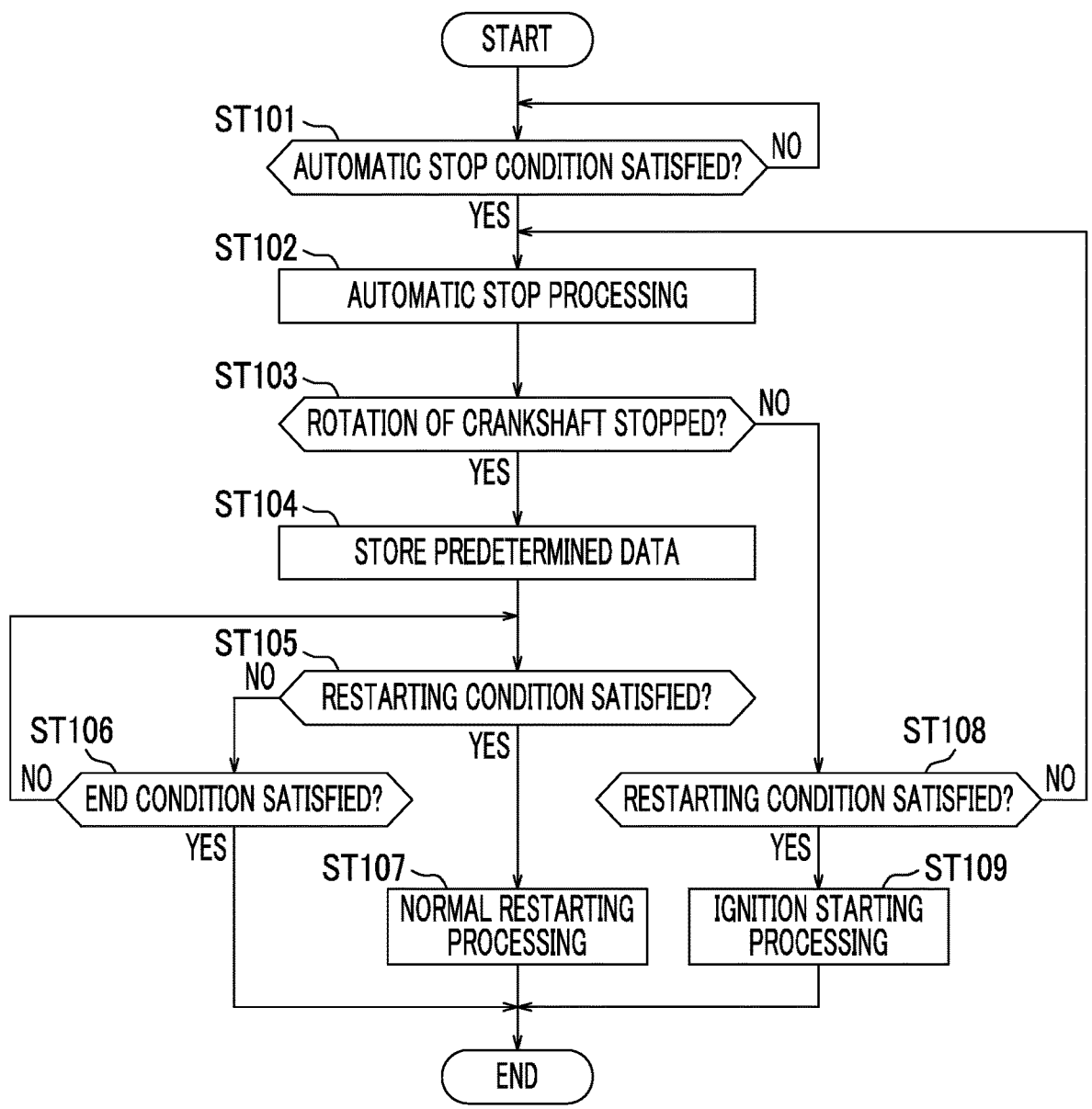
FIG. 3 is a flowchart illustrating a routine of stop and start control related to the embodiment.

The flow of overall processing of a stop and start control routine is illustrated in FIG. 3. The routine is repeatedly executed at a predetermined timing in the ECU 100. First, whether or not a predetermined automatic stop condition is satisfied during the operation of the engine 1 is determined in Step ST101. When the determination is negative (NO), a return is made, and when the determination is positive (YES), the process proceeds to Step ST102 in which automatic stop processing of the engine 1 is executed.

The automatic stop condition may be set to include, as an example, the engine 1 being in an operating state, being in an accelerator-off state (the throttle valve opening degree is equal to or less than a predetermined threshold value and almost zero), being in a brake-on state (a brake stepping force is equal to or more than a predetermined threshold value), and the vehicle speed being equal to or lower than a predetermined threshold value, or the like (a case where the engine is considered to be immediately before a stop or a case where the engine is considered to be substantially stopped.

Although the automatic stop processing of Step ST102 will be described below in detail, the automatic stop processing is one in which the fuel injection from the injector 19 is stopped (fuel cut), and ignition caused by the ignition plug 20 is also stopped slightly later. Accordingly, since the combustion torque of an air-fuel mixture is no longer generated, the rotation speed of the crankshaft 13 that rotates with inertia decreases gradually as illustrated in the FIG. 2.

When the rotation speed of the crankshaft 13 decreases gradually as described above, it is preferable that the opening degree of the throttle valve 33 is controlled in accordance with the degree of decrease of a crank rotation speed Nc (a value obtained by averaging the rotation speeds of the crankshaft 13, and illustrated by a one-dot chain line in FIG. 2). For example, it is preferable to stop the operation of an auxiliary machine used as an external load of the engine 1, such as an alternator or a compressor of an air-conditioner.

The stop of rotation of the crankshaft 13 is determined as will be described below in detail (Step ST103). When the determination is negative (NO), the process proceeds to Step ST108 (to be described below) in which whether or not a predetermined restarting condition is satisfied is determined. When the determination is also a negative determination (NO), the process returns to Step ST102, whereas when the determination is positive (YES), the process proceeds to Step ST109 in which ignition starting processing of the engine 1 is performed to end the routine (END).

The ignition starting processing is processing in which the engine 1 is restarted by using the inertia of rotation of the crankshaft 13 without using the starter motor 18, and is performed when a driver changes his/her mind (Change Of Mind: COM) in the middle of an automatic stop of the engine 1 and starts the engine 1 again. Since the driver, for example, releases the brake pedal and steps on the accelerator pedal in such a case, the restarting condition of the engine 1 is satisfied.

When a cylinder 2 (for example, a third cylinder 2 at times t1 to t2 described above with reference to FIG. 2) in a compression stroke transits to an expansion stroke beyond a top dead center (#3TDC), fuel is injected by the injector 19, and thereby, ignited by the ignition plug 20 while waiting for an air-fuel mixture to be formed. Accordingly, a rotative force can be applied to a crankshaft 13, and the engine 1 can be started without using the starter motor 18.

On the other hand, when a positive determination (YES) that the rotation of the crankshaft 13 is stopped is made in Step ST103, that is, when a stop process of the engine 1 is completed, the process proceeds to Step ST104 in which predetermined data is stored in the backup RAM. The process proceeds to Step ST105 in which whether or not the restarting condition of the engine 1 is satisfied is determined. When the determination is negative (NO), the process proceeds to Step ST106 in which whether or not an end condition of the stop and start control is satisfied, such as an ignition switch of the vehicle being turned off, is determined.

When the end condition is satisfied and the determination is positive (YES), the routine is ended (END), whereas when the end condition is not satisfied and the determination is negative (NO), the process returns to Step ST105 in which the satisfaction of the restarting condition is determined again. When the restarting condition satisfies and the determination is positive (YES) while the waiting is performed as described above, the process proceeds to Step ST107 in which the normal restarting processing of the engine 1 is executed.

The restarting condition of the engine 1 in Step ST105 and ST108 may be set to include, for example, the stepping force of the brake pedal being reduced and becoming smaller than the predetermined threshold value, accelerator stepping operation being performed, a predetermined operation of a shift lever being performed, or the like.

Although detailed description regarding the normal restarting processing is omitted, for example, the starter motor 18 is operated to start cranking, the injection of fuel by the injector 19 is started, and the ignition caused by the ignition plug 20 is also started. Accordingly, when combustion is started in one of the cylinders 2 (initial explosion) and an engine speed increases to a predetermined value, the routine is ended (completion of the starting) (END).

Engine Stop Determination

The determination of rotation stop of the crankshaft 13 in Step ST103 of the flow is described in detail. When the engine 1 stops, first, the engine speed decreases gradually as illustrated in an upper stage of the FIG. 2, and the rotation speed of the crankshaft 13 also decreases as a whole as illustrated in a middle stage of FIG. 2. Since intervals in which crank signals are input become long, as illustrated in a lower stage of FIG. 2, the inclination of a graph of the crank counter gradually becomes gentle.

In a process in which the engine 1 stops as described above, the rotation of the crankshaft 13 is reduced in speed by an in-cylinder pressure (compression reaction force) that rises in the compression stroke for each cylinder 2, and the rotation speed of the crankshaft 13 decreases gradually as the piston approaches the top dead center (TDC) as illustrated in the middle stage of FIG. 2. On the other hand, when the piston transits to an expansion stroke beyond the top dead center, the rotation of the crankshaft 13 is shortly accelerated this time by the in-cylinder pressure. Thus, the rotation speed of the crankshaft 13 increases.

That is, the rotation speed of the crankshaft 13 decreases gradually as a whole as illustrated by the one-dot chain line in FIG. 2 while repeating a decrease and an increase before and after top dead centers (#1TDC, #3TDC, #4TDC, . . . ) of the respective cylinders 2. Accordingly, the inertia force of the rotation becomes small, and in the illustrated example, and after a top dead center (#3TDC) of a third cylinder 2 is exceeded at time t2, it is not possible to exceed a top dead center (#4TDC: does not reach) against the in-cylinder pressure of a fourth cylinder 2 at time t3.

For this reason, the crankshaft 13 stops through a period of swing-back in which the crankshaft 13 is reversely operated after being stopped for a moment prior to the top dead center, and then is slightly operated again in a normal rotational direction. In this case, after the crankshaft 13 is reversely operated at time t3, the crank counter decreases in accordance with the crank signal. When the rotational direction is normal again at time t4, the crank counter increases at time t5.

When an angle at which the crankshaft 13 is rotated while being stopped through the swing-back period as described above becomes small, the crank signal is no longer output from the crank angle sensor 101. When the time for which no crank signal is input as at times t5 to t6 reaches a preset time Δt (time t6), the rotation of the crankshaft 13 is determined to have stopped (that is, the engine 1 is determined to have stopped).

Spark Discharge Caused by Ignition Plug at Engine Stop

Meanwhile, as the automatic stop processing (Step ST102 of FIG. 3) of the engine 1, in the present embodiment, emissions are reduced by continuing the spark discharge caused by an ignition plug for a while after fuel is cut first, and by igniting unburned fuel within the cylinder 2 by the ignition plug 20. In this case, generally, an energization start timing to the ignition coil 21 is before the top dead center of the cylinder 2, and an energization cutoff timing (namely, the ignition timing of the ignition plug 20) is after the top dead center.

However, when the time for which the spark discharge caused by the ignition plug is continued after a fuel cut as described above is excessively longer than usual, there is a possibility that unneeded spark discharge caused by the ignition plug may be performed even after the unburned fuel is substantially exhausted, and wasteful power consumption may increase extremely. Moreover, when the crankshaft 13 is reversely operated during energization to the ignition coil 21, energization time may become extremely long. As a result, there is a possibility that the wasteful power consumption may increase extremely, the degradation of the ignition coil 21 may be accelerated, and there is also a possibility that the service life of the ignition coil 21 is shortened.

That is, as described above with reference to FIG. 2, immediately before the stop of the engine 1, the crankshaft 13 is reversely operated due to a rise in the in-cylinder pressure of one of the cylinders 2 prior to the top dead center of the cylinder 2, and consequently, does not reach the energization cutoff timing after the top dead center. For this reason, when the energization to the ignition coil 21 is started before the reverse operation of the crankshaft 13 starts, the energization continues until a guard time (for example, tens of milliseconds) set for the protection of the ignition coil 21 elapses, and the time of the energization becomes extremely long.

Thus, in the present embodiment, at an automatic stop of the engine 1, the spark discharge (namely, energization control to the ignition coil 21) caused by the ignition plug is stopped after the crank rotation speed Nc decreases gradually after a fuel cut and reaches a preset threshold value Nc1 or less. When the crank rotation speed Nc becomes lower than the threshold value Nc1, the threshold value Nc1 is set to a rotation speed that is considered that the crankshaft 13 is reversely operated due to the in-cylinder pressure (compression reaction force) of the cylinder 2 as described above.

Figure 4:
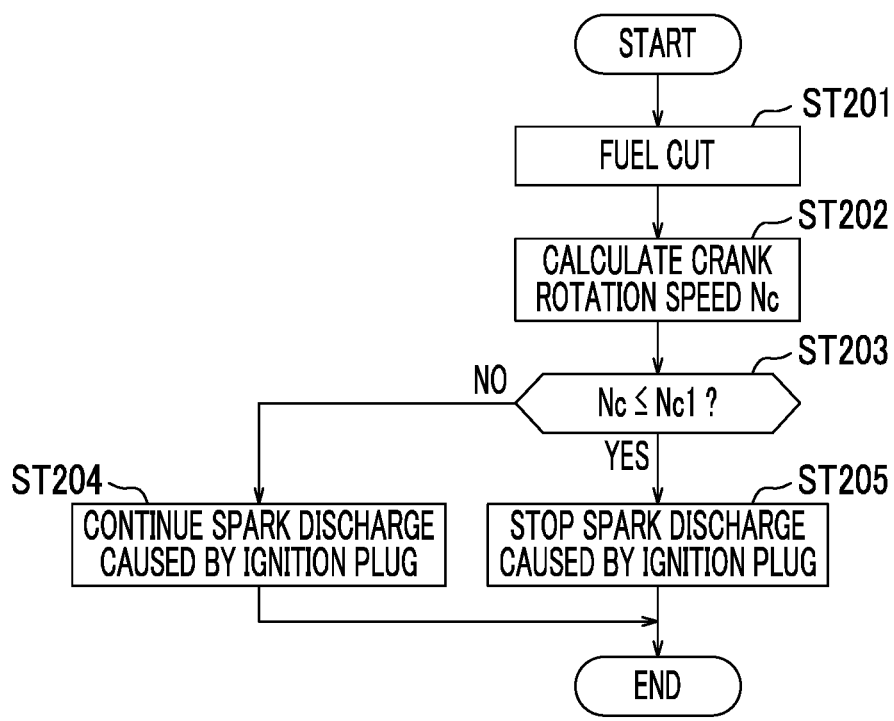
FIG. 4 is a flowchart illustrating a routine of automatic stop processing related to the embodiment.

In the following, the automatic stop processing of the engine 1 will be specifically described in accordance with a flowchart of FIG. 4 and also with reference to a timing chart of FIG. 5. A routine illustrated in FIG. 4 is the automatic stop processing (Step ST102) of the engine 1 described above with reference to FIG. 3, and is started at a predetermined timing (for example, when a flag showing the execution of the automatic stop processing is turned on). First, in Step ST201, injection of fuel by the injector 19 of each cylinder 2 is stopped (fuel cut).

Figure 5:
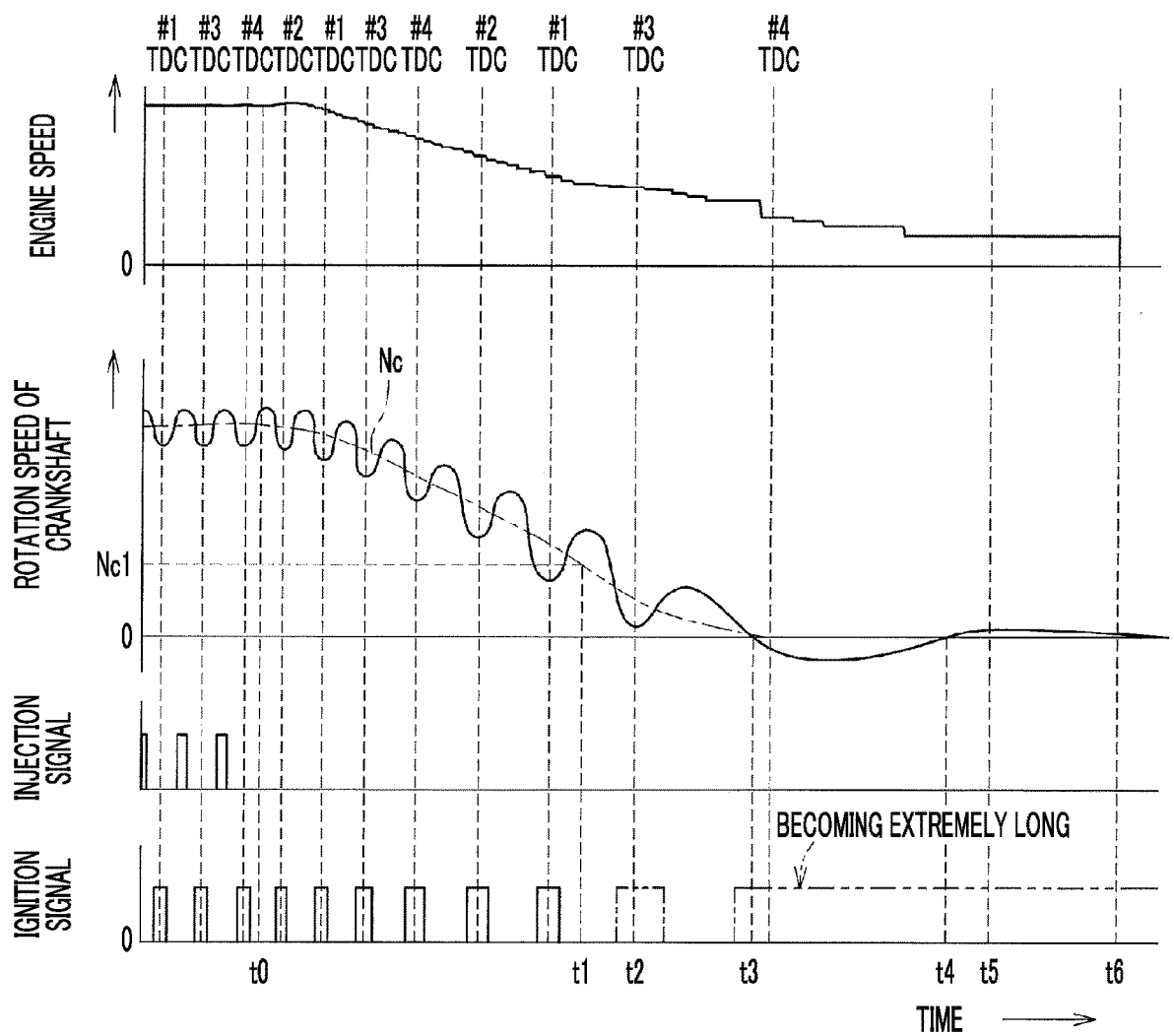
FIG. 5 is a timing chart illustrating a decrease in crank rotation speed at an engine automatic stop, and spark discharge caused by an ignition plug after a fuel cut.

Accordingly, when a fuel cut is started at time t0 of FIG. 5 and an injection signal from the ECU 100 is no longer output, the combustion torque of an air-fuel mixture is not generated in each cylinder 2 of the engine 1. As a result, the rotation speed of the crankshaft 13 that rotates with inertia (and the crank rotation speed Nc illustrated by a one-dot chain line) decreases gradually. On the other hand, during this period, the spark discharge caused by the ignition plug is continued, and an energization signal and a cutoff signal (hereinafter, the rising of a pulse illustrated in FIG. 5 is the energization signal and the falling of the pulse is a cutoff signal, and these signals are also referred to as an ignition signal together) are output from the ECU 100 to the ignitor 22, respectively.

That is, in Step ST202 of the flow of FIG. 4, the crank rotation speed Nc is calculated as a moving average, at a predetermined time, of the rotation speed of the crankshaft 13 calculated from the crank signal. In the present embodiment, the crank rotation speed Nc is an average value at the time when the crank rotation speed is shorter than the engine speed. However, the crank rotation speed Nc may be an average value at the time when the engine speed is calculated without being limited to this average value.

Whether or not the crank rotation speed Nc calculated as described above became equal to or less than the preset threshold value Nc1 is determined in Step ST203. When the crank rotation speed Nc becomes lower than the threshold value Nc1 as described above, the threshold value Nc1 is not able to exceed the top dead center against an increase in the in-cylinder pressure of the cylinder 2. As a result, a rotation speed at which the crankshaft 13 is reversely operated is set in advance by experiment or simulation.

The threshold value Nc1 varies by being influenced by individual variations of the inertia or friction of rotating parts including the crankshaft 13, changes in load caused by the operation of the alternator and the engine auxiliary machine, the properties of engine oil, the amount of intake air filled into the cylinder 2, and the like. Therefore, threshold value Nc1 is set to a slightly higher value so that the occurrence of the reverse operation can be determined with a margin.

When the determination is negative (NO) in Step ST203, the process proceeds to Step ST204 in which the spark discharge caused by the ignition plug is executed. That is, the energization signal is output at a predetermined crank angle before the top dead center sequentially from the cylinder 2 (the cylinder 2 in the compression stroke) that faces the top dead center next, and the energization to the ignition coil 21 is started. Also, the cutoff signal to the predetermined crank angle after the top dead center (energization cutoff timing) is output, the energization to the ignition coil 21 is cut off, ignition is performed by the ignition plug 20, and the routine is ended (END).

By doing as above, as described above with reference to FIG. 3, before the stop of rotation of the crankshaft 13 is determined in the stop and start control routine (NO in Step ST103) or before the satisfaction of the engine restarting condition is determined (NO in Step ST108), the process returns to Step ST102 in which the automatic stop processing of the engine 1 is continued. That is, the processing of Steps ST201 to ST203 of the flow of FIG. 4 is repeated.

As described above, the spark discharge caused by the ignition plug is continued for a while even after a fuel cut (times t0 to t1 of FIG. 5). In an example of FIG. 5, ignition is performed by ignition plugs 20 of a second cylinder 2, the first cylinder 2, the third cylinder 2, and the fourth cylinder 2, and again the second cylinder 2 and the first cylinder 2, and the unburned fuel is combusted. When the crank rotation speed Nc decreases gradually and becomes equal to or less than the threshold value Nc1 as illustrated at time t1 of FIG. 5, the determination is positive (YES) in Step ST203 of the flow of FIG. 4, the process proceeds to Step ST205, the spark discharge caused by the ignition plug is stopped, and the routine is ended (END).

Accordingly, after time t1, as illustrated by a virtual line in FIG. 5, the ignition signal is no longer output and the energization to the ignition coil 21 is no longer performed. Accordingly, in the example of FIG. 5, after the top dead center (#3TDC) of the third cylinder 2 is exceeded at time t2, the crankshaft 13 is reversely operated due to a rise of the in-cylinder pressure of the fourth cylinder 2 at time t3, and then is stopped (time t6) through a swing-back period (time t3 to T5).

When the crankshaft 13 is reversely operated as described above, the crankshaft 13 does not reach the energization cutoff timing beyond the top dead center (#4TDC) of the fourth cylinder 2. Thus, if the spark discharge caused by the ignition plug is continuing, the energization time to the ignition coil 21 becomes extremely long as illustrated by a virtual line. However, in the present embodiment, the spark discharge caused by the ignition plug is already stopped and the energization to the ignition coil 21 is not started. Thus, there is no concern that the energization time becomes extremely long as described above.

By executing Steps ST203 to ST205 of the flow of the FIG. 4, the ECU 100 constitutes an electronic control unit that cuts off the energization after elapse of a predetermined period from the start of energization to the ignition coil 21 for each cylinder 2 of the engine 1, and causes spark discharge to be performed by the ignition plug 20. The electronic control unit is configured such that the spark discharge caused by the ignition plug is stopped from the cylinder 2 after the crank rotation speed Nc decreases gradually after a fuel cut and reaches the preset threshold value Nc1 or less.

In the present embodiment as described above, when the engine 1 of the vehicle is automatically stopped by the stop and start control, first, a fuel cut is performed, and thereby, the rotation speed of the crankshaft 13 decreases gradually. In this case, when the crank rotation speed Nc is higher than the threshold value Nc1, the spark discharge caused by the ignition plug is continued, and thereby, the unburned fuel within the cylinder 2 is combusted. As a result, aggravation of emissions is further suppressed.

On the other hand, when the crank rotation speed Nc decreases gradually and becomes the threshold value Nc1 or less, the spark discharge caused by the ignition plug is stopped, and thereby the wasteful power consumption is further suppressed. In the present embodiment, when the crank rotation speed Nc becomes lower than the threshold value Nc1, the threshold value Nc1 is set to such a rotation speed that the rotation of the crankshaft 13 is stopped and the crankshaft is reversely operated. Thus, by stopping the spark discharge caused by the ignition plug at the threshold value Nc1 or less, the crankshaft 13 is no longer reversely operated during the energization to the ignition coil 21. As a result, the energization time can be further restrained from becoming extremely long.

That is, by virtue of a suitable spark discharge caused by the ignition plug after a fuel cut, the wasteful power consumption caused by unneeded energization to the ignition coil 21 can be further suppressed without causing the aggravation of emissions at an automatic stop of the engine 1. In addition, premature degradation of the ignition coil 21 resulting from the reverse operation of the crankshaft 13 immediately before the engine stop can be further restrained.

Modification Example 1

Modification Example 1 in which a timing for starting the energization (energization start timing) to the ignition coil 21 is retarded in accordance with a decrease in the crank rotation speed Nc at an automatic stop of the engine 1 will be described with reference to FIGS. 6 and 7. Also in Modification Example 1, the configuration of the control system of the engine 1, the procedure of the stop and start control, and the like are the same as those of the above-described embodiment, and different portions will be described below.

Figure 6:
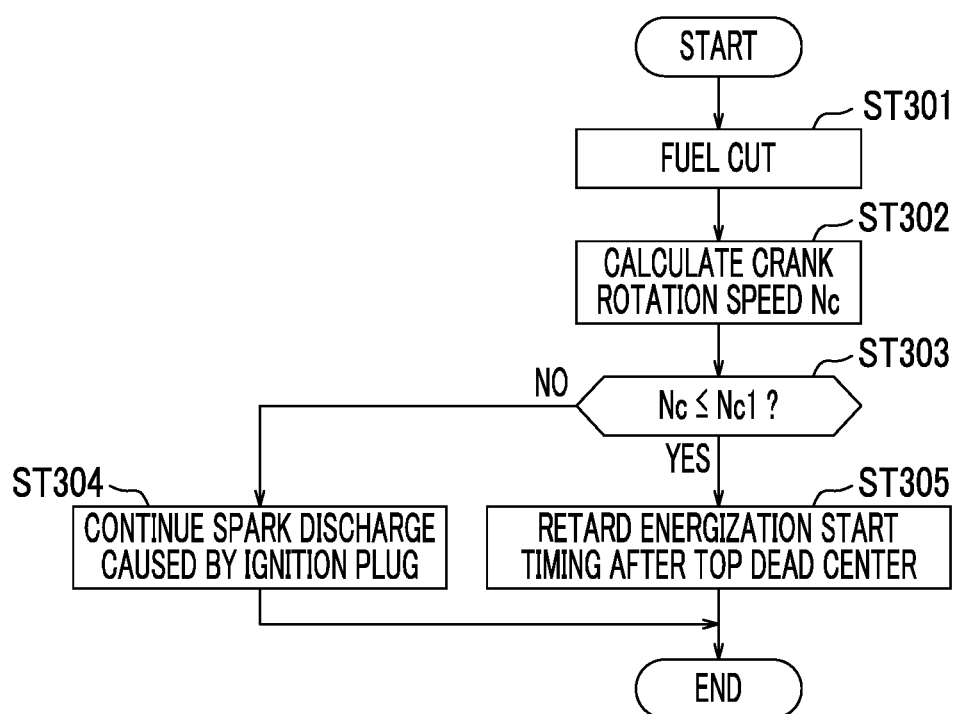
FIG. 6 is a view equivalent to FIG. 4 related to Modification Example 1 in which energization start timing is retarded in accordance with the decrease in the crank rotation speed.

A routine of the automatic stop processing related to Modification Example 1 is illustrated in FIG. 6, and first, the same processing as Steps ST201 to ST203 of the flow of FIG. 4 is performed in Steps ST301 to ST303 after a start. When a negative determination (NO) that the crank rotation speed Nc is higher than the threshold value Nc1 is made in Step ST303, the process proceeds to Step ST304, the spark discharge caused by the ignition plug that is the same as Step ST204 is executed, and the routine is ended (END).

Figure 7:
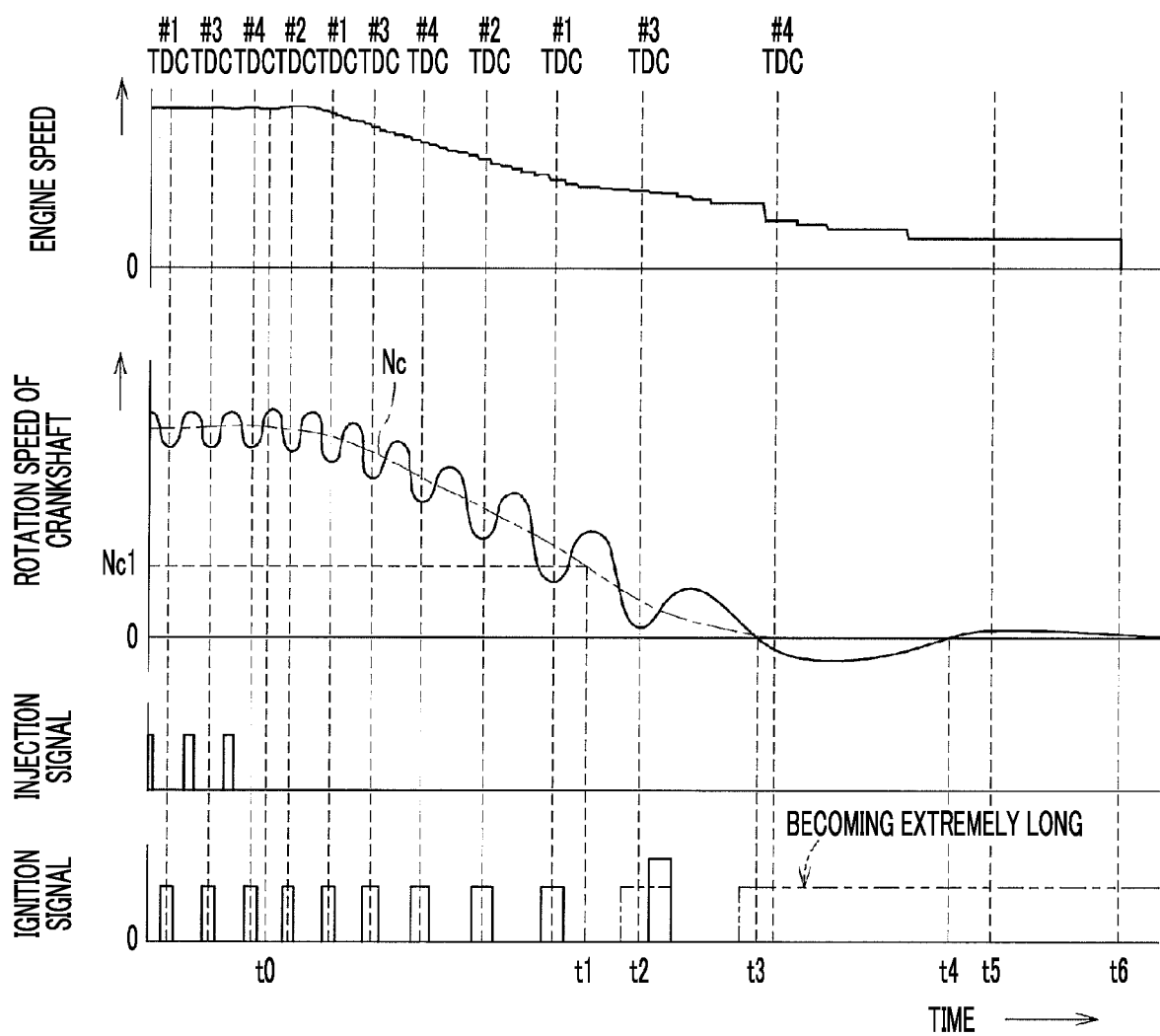
FIG. 7 is a view equivalent to FIG. 5 related to Modification Example 1.

Accordingly, when a fuel cut is started at time t0 of FIG. 7 and the rotation speed of the crankshaft 13 that rotates with inertia (and the crank rotation speed Nc illustrated by a one-dot chain line) decreases gradually, the spark discharge caused by the ignition plug is continued and the ignition signal is output from the ECU 100 to the ignitor 22. Therefore, the unburned fuel is combusted within the cylinder 2 of the engine 1, and the aggravation of emissions is further suppressed.

When the crank rotation speed Nc decreases gradually and becomes equal to or less than the threshold value Nc1 as illustrated at time t1 of FIG. 7, the determination is positive (YES) in Step ST303 of the flow of FIG. 6, and the process proceeds to Step ST305. Here, while the spark discharge caused by the ignition plug is continued, the energization start timing (the output timing of the energization signal that is the rising of the ignition signal) to the ignition coil 21 is retarded until after the top dead center of the cylinder 2, and the routine is ended (END).

Accordingly, in an example of FIG. 7, in the third cylinder 2 that faces a top dead center for the first time after time t1, the start of energization to the ignition coil 21 is delayed until after the top dead center (#3TDC) of the third cylinder 2. As a result, as illustrated by a solid line in FIG. 7, the energization to and the cutoff from the ignition coil 21 are performed immediately after the top dead center (#3TDC) of the third cylinder 2 is exceeded at time t2, and the unburned fuel is ignited by the ignition plug 20.

When the crankshaft 13 is reversely operated at time t3 due to a rise in the in-cylinder pressure of the fourth cylinder 2, the energization start timing is not reached beyond the top dead center of the fourth cylinder 2. Thus, no ignition signal is output from the ECU 100 and the energization to the ignition coil 21 is not performed. Therefore, as illustrated by a virtual line in FIG. 7, the energization time does not become extremely long and the premature degradation of the ignition coil 21 from the above can be further restrained.

Hence, also in Modification Example 1, similar to the above-described embodiment, by virtue of a suitable spark discharge caused by the ignition plug after a fuel cut, the wasteful power consumption caused by unneeded energization to the ignition coil 21 can be further suppressed without causing the aggravation of emissions at an automatic stop of the engine 1, and the premature degradation of the ignition coil 21 resulting from the reverse operation of the crankshaft 13 can be further restrained.

The energization start timing may be gradually retarded in accordance with a decrease in the crank rotation speed Nc from before the rotation speed Nc becomes the threshold value Nc1 or less without retarding the energization start timing to the ignition coil 21 after the crank rotation speed Nc becomes the threshold value Nc1 or less unlike the above description. By doing as above, the energization time is shortened as much as the retardation of the energization start timing Thus, further suppression of the power consumption becomes possible.

Modification Example 2

Modification Example 2 in which the energization to the ignition coil 21 is cut off in accordance with the reverse operation of the crankshaft 13 without changing the spark discharge caused by the ignition plug according to a decrease in the crank rotation speed Nc like the above embodiment and Modification Example 1 will be described with reference to FIGS. 8 and 9. Also in Modification Example 2, the configuration of the control system of the engine 1, the procedure of the stop and start control, and the like are the same as those of the above embodiment, and different portions will be described below.

Figure 8:
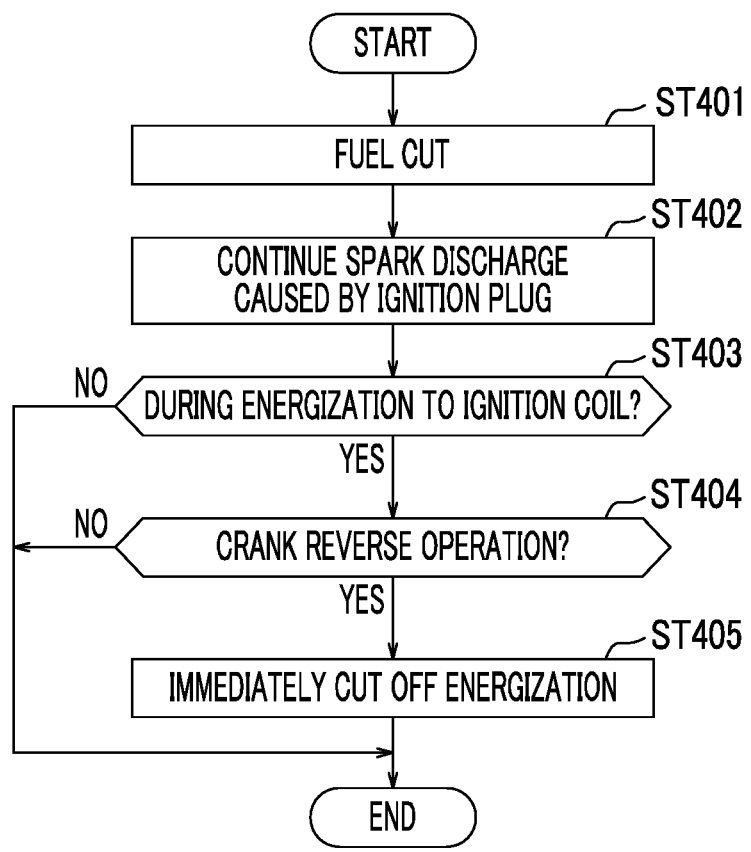
FIG. 8 is a view equivalent to FIG. 4 related to Modification Example 2 in which energization is immediately cut off when the crankshaft is reversely operated.

The routine of the automatic stop processing related to the modification example 2 is illustrated in FIG. 8. First, in Step ST401 after start, a fuel cut is performed similar to Step ST201 of the flow of FIG. 4, and in Step ST402, processing of the spark discharge caused by the ignition plug is performed similar to Step ST204. Accordingly, when the rotation speed of the crankshaft 13 decreases gradually after a fuel cut is started at time t0 of FIG. 9, the spark discharge caused by the ignition plug is continued and the unburned fuel is combusted within the cylinder 2.

In Step ST403 of the flow of FIG. 8, whether or not the ignition coil 21 is being energized is determined. When a negative determination (NO) that the ignition coil is not being energized is made, the routine is ended (END). On the other hand, when a positive determination (YES) that the ignition coil is being energized is made, the process proceeds to Step ST404 in which whether or not the crankshaft 13 is reversely operated this time is determined (crank reverse operation?). When the determination is negative (NO), the routine is ended (END).

Figure 9:
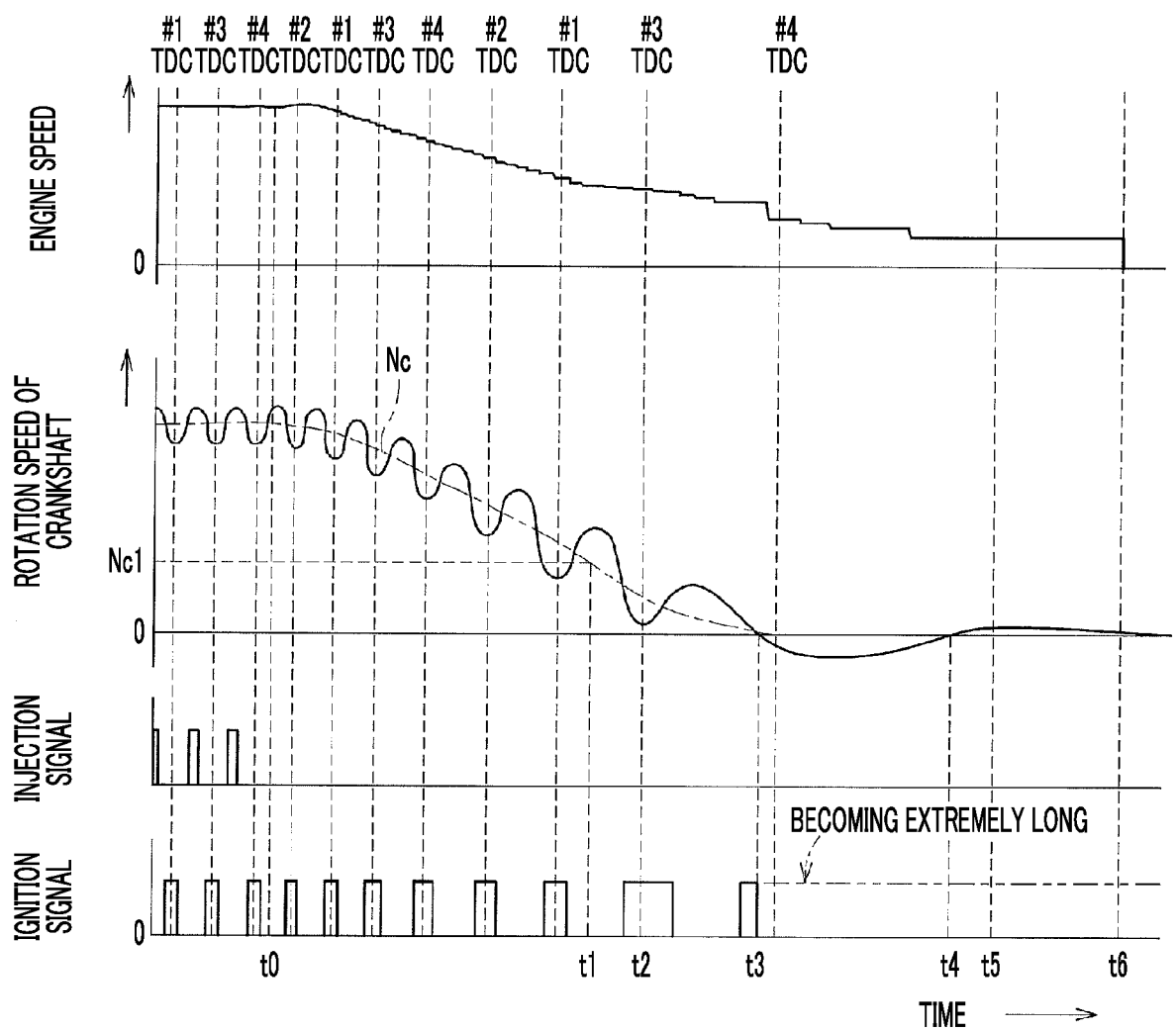
FIG. 9 is a view equivalent to FIG. 5 related to Modification Example 2.

Before the crankshaft 13 is reversely operated at time t3 in FIG. 9, the routine is ended as described above, and the processing of Steps ST401 to ST404 is repeated in a predetermined cycle. Even when the crank rotation speed Nc decreases to the threshold value Nc1 or less as in the above embodiment and Modification Example 1 (time t1), the spark discharge caused by the ignition plug is continued. The energization to the ignition coil 21 is performed also before and after the last top dead center (in the illustrated example, the top dead center #3TDC of the third cylinder 2) before the rotation of the crankshaft 13 is stopped.

After the top dead center (#3TDC) of the third cylinder 2 is exceeded as described above, at time t3 of FIG. 9, the crankshaft 13 is reversely operated due to a rise in the in-cylinder pressure of the fourth cylinder 2, and does not reach the energization cutoff timing beyond the top dead center (#4TDC). In an example of FIG. 9, since the energization to the ignition coil 21 is started before the reverse operation of the crankshaft 13, there is a possibility that the energization time may become extremely long as illustrated by a virtual line.

However, in this case, the determination is positive (YES) in Steps ST403 and ST404 of FIG. 8, the process proceeds to Step ST405, the energization to the ignition coil 21 is cut off, and the routine is ended (END). That is, the cutoff signal is output from ECU 100 to the ignitor 22, the pulse of the ignition signal falls at time t3 of FIG. 9, and the energization to the ignition coil 21 is cut off.

Hence, in Modification Example 2, similar to the above-described embodiment and Modification Example 1, the aggravation of emissions at an automatic stop of the engine 1 can be restrained by continuing the spark discharge caused by the ignition plug even after a fuel cut. Also, when the crankshaft is reversely operated after the energization to the ignition coil 21 is started for that purpose, the energization is immediately cut off. Thus, from the above description, the energization time does not become extremely long, the wasteful power consumption can be further suppressed, and the premature degradation of an ignition coil can be further restrained.

Other Embodiments

The description of the embodiment described above is merely an example and is not intended to limit the configuration, application, and the like of the present disclosure. For example, in the above embodiment, when the crank rotation speed Nc becomes the threshold value Nc1 or less when the engine 1 is automatically stopped by the stop and start control, the spark discharge caused by the ignition plug is stopped. However, the present disclosure is not limited to this, and the spark discharge caused by the ignition plug may be stopped, for example, when the engine speed becomes equal to or less than below the threshold value.

In the above embodiment and Modification Example 1, when the crank rotation speed Nc becomes the threshold value Nc1 or less, the spark discharge caused by the ignition plug is stopped, or the energization start timing to the ignition coil 21 is retarded. However, the aspect of the present disclosure is not limited to this, and for example, the guard time of the energization time set for the protection of the ignition coil 21 may be shortened.

In Modification Example 1 of the above embodiment, the energization start timing to the ignition coil 21 is retarded in accordance with a decrease in the crank rotation speed Nc. In Modification Example 2, the energization to the ignition coil 21 is cut off in accordance with the reverse operation of the crankshaft 13. However, the configurations of Modification Examples 1 and 2 may be appropriately combined together.

For example, the energization start timing to the ignition coil 21 may be retarded in accordance with a decrease in the crank rotation speed Nc after a fuel cut, and when the crank rotation speed Nc becomes the threshold value Nc1 or less, the spark discharge caused by the ignition plug may be stopped. For example, the energization start timing to the ignition coil 21 may be retarded in accordance with a decrease in the crank rotation speed Nc after a fuel cut, and the energization to the ignition coil 21 may be cut off in accordance with the reverse operation of the crankshaft 13.

In the above embodiment, the automatic stop condition is set to include a case where the vehicle speed is equal to or lower than the predetermined threshold value (in a case where the engine is considered to be immediately before a stop and a case where the engine is considered to be substantially stopped). However, the aspect of the present disclosure is not limited to this and can also be applied to a case where the engine 1 is automatically stopped and restarted during the traveling of a vehicle. The aspect of the present disclosure can be applied to the case of a manual stop as well as the automatic stop of the engine 1.

In the above embodiment, a case where the aspect of the present disclosure is applied to the in-cylinder injection type gasoline engine 1 mounted on a vehicle has been described. However, the aspect the present disclosure is not limited to this and can also be applied to a port injection type gasoline engine. The aspect of the present disclosure can also be applied to a diesel engine, an alcohol engine, a gas engine, or the like without being limited to the gasoline engine.

In the aspect of the present disclosure, the wasteful power consumption can be further suppressed without causing the aggravation of emissions at an engine stop, and the premature degradation of the ignition coil can be further restrained. Thus, for example, the aspect of the present disclosure is highly effective when being applied to stop and start control or the like of an engine mounted on an automobile.

What is claimed is:

1. An engine control device comprising:
an electronic control unit configured to
perform a spark discharge with an ignition plug for each cylinder by cutting off energization after elapse of a predetermined period from start of energization to an ignition coil for each cylinder of the engine,
continue the spark discharge caused by the ignition plug for each cylinder of the engine after supply of fuel to the engine is stopped when operation of the engine is stopped and a rotation speed of a crankshaft is greater than a preset threshold value, and
retard an energization start timing to the ignition coil when the rotation speed of the crankshaft is less than or equal to the preset threshold value after the stop of the supply of fuel to the engine,
wherein the electronic control unit is configured to retard the energization start timing to the ignition coil until after a compression top dead center of a cylinder when the rotation speed of the crankshaft becomes equal to or lower than the preset threshold value.

2. The engine control device according to claim 1, wherein the electronic control unit is configured to retard the energization start timing after the stop of the supply of fuel to the engine and the rotation speed of the crankshaft is greater than the preset threshold value.

* * * * *